(12) United States Patent
Nishihara (10) Patent No.: US 7,354,198 B2
(45) Date of Patent: Apr. 8, 2008

(54) LINEAR MOTION GUIDE UNIT (75) Inventor: Toyohisa Nishihara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 192 days.

(21) Appl. No.: 11/228,205

(22) Filed: Sep. 19, 2005

(65) Prior Publication Data
US 2006/0078237 A1 Apr. 13, 2006

(30) Foreign Application Priority Data
Oct. 7, 2004 (JP) ............................. 2004-294515

(51) Int. Cl.
*F16C 29/06* (2006.01)
(52) U.S. Cl. ........................................ 384/13; 384/44
(58) Field of Classification Search ................. 384/13, 384/43–45
See application file for complete search history.

(56) References Cited
U.S. PATENT DOCUMENTS
5,193,914 A * 3/1993 Tanaka ........................ 384/44
5,800,064 A * 9/1998 Ohya ........................... 384/44
6,712,511 B2 * 3/2004 Matsui et al. .................. 384/45

FOREIGN PATENT DOCUMENTS
| JP | 9-72335 A | 2/1997 |
| JP | 10-78032 A | 2/1998 |
| JP | 2001-82469 A | 3/2001 |
| JP | 2001-248637 A | 9/2001 |

* cited by examiner

*Primary Examiner*—Thomas R. Hannon
(74) *Attorney, Agent, or Firm*—Browdy and Neimark, PLLC (57) ABSTRACT

A linear motion guide unit is disclosed in which a tubular composition to provide a return passage is high in mechanical stiffness and also makes certain of steady application of lubricant to rolling elements rolling through the return passage, thereby ensuring proper lubrication under maintenance-free operation. The return passage is defined inside a hole of a tubular composition installed in an axial bore made in the carriage of a slider. The tubular composition is composed of a tubular skeleton made therein with a window, and a cellular molded member that fits into the window. The rolling elements of cylindrical roller, when coming into rolling-contact with the cellular member while rolling through the return passage, are applied with lubricant film.

13 Claims, 6 Drawing Sheets

LINEAR MOTION GUIDE UNIT

FIELD OF THE INVENTION

The present invention relates to a linear motion guide unit comprised of an elongated guide rail, and a slider that is allowed to move on the elongated guide rail relatively to the guide rail by virtue of more than one rolling element.

BACKGROUND OF THE INVENTION

The recently remarkable development in mechatronics technology extensively requires various sorts of linear motion guide units, especially, linear motion guide units of the type using rolling elements of cylindrical roller, which are also required to meet with the maintenance-free operation where there is no need of lubricant replenishment for considerably long service life even under severe operating conditions. Most conventional linear motion guide units are composed of an elongated guide rail and a slider that moves relatively to the guide way by virtue of more than one rolling element, which is allowed to roll through a recirculating circuit that is made up of a load-carrying race defined between the guide rail and the slider, and a non-loaded area including a return passage and turnaround passages made in the slider. With the prior linear motion guide units constructed as stated earlier, continuous application of lubricant on or between the load race and the rolling element is inevitable to continue maintaining an adequate lubricant film between the load race and the rolling element to keep them against metal-to-metal contact that might otherwise occur, thereby making sure of their high durability. To deal with the lubrication issue, most prior linear motion guide units have been ordinarily lubricated with periodic replenishment of lubricant so as to make certain of forming the lubricant film separating the rolling element from the circulating race. Recently advanced machines and instruments, nevertheless, are increasingly needed to make them virtually maintenance-free from many aspects of conserving energy as well as keeping running cost and maintenance cost of equipment reasonable. Correspondingly, the linear motion guide units built in the advanced machinery are also challenged to keep the consumption of lubricant to a minimum, along with keeping linear motion guide units virtually maintenance free.

In the commonly assigned Japanese Patent Laid-Open No. 2001-082469, there is disclosed a linear motion guide unit in which a return passage in a carriage of the slider is made of sintered resinous member of cellular or porous structure that is impregnated with lubricant to be applied on the rolling elements. The prior linear motion guide unit is comprised of an elongated guide rail, a slider movable lengthwise relative to the guide rail, and more than one rolling element allowed rolling into the load race defined between the guide rail and the slider from the non-loaded return passage cut in the slider, and vice versa in a recirculating manner. The return passage is constituted with a sleeve of sintered resinous member having cellular structure, which fits into a fore-and-aft hole made in the carriage of the slider. Oily lubricant or grease once soaked in the sintered resinous member preparatory to fit into the carriage is reserved or held in the cells or pores in the cellular structure. Oily ingredient of the lubricant is constantly applied on the rolling elements while rolling through inside the sleeve, and oil films around any rolling elements get lubricating smoothly the load-carrying surfaces or raceway grooves as the rolling elements run through load race, with accompanying reduced maintenance.

Another commonly assigned Japanese Patent Laid-Open No. H09-072335 discloses a linear motion guide unit in which a sleeve for a return passage fits into a fore-and-aft hole made in a carriage of the slider to provide the return passage. The sleeve is made easier to experience elastic deformation to absorb the frictional resistance occurring on the rolling elements, thereby ensuring smooth running of the rolling elements. With the linear motion guide unit constructed as recited just earlier, the rolling elements are made in the form of cylindrical roller while the return passage is defined by the sleeve that fits closely into the return hole cut in the carriage. The sleeve is made it possible to get elastic deformation, ensuring smooth traveling of the slider. Especially, as seen in FIGS. 11 to 13 in the cited disclosure, an ample clearance is left between the wall surface inside the return passage and the outside surface around the middle area of the sleeve to allow the sleeve to get elastically deformed therein and also reserve lubricant therein.

Another sort of linear motion guide means is disclosed in Japanese Patent Laid-Open No. H10-078032, in which there is used lubricant-containing polymer to lubricate the rolling element of ball. With the linear motion guide means recited now, a sleeve allowing the rolling elements running through is made of tubular composition of lubricant-containing polymer, which is composed of cylindrical skeleton cage of polyethylene high in stiffness or mechanical strength, the skeleton cage being made therein with lengthwise windows opened from the outside to the inside thereof and spaced away from one another at regular intervals around the circular surface of the skeleton cage, and lubricant-containing polymer segments that fit closely into the windows, one to each window. For production of the tubular composition of lubricant-containing polymer, the polyethylene skeleton cage prepared in advance by injection molding is positioned within a preselected mold held in any injection molding machine, and then molten lubricant-containing polymer is poured into the mold cavity, where it solidifies as it cooled, coming into joining integrally with the skeleton cage.

Another Japanese Patent Laid-Open No. 2001-248637 discloses a linear motion guide unit making it easier to ensure lubrication of circulating balls with lubricant that may be simply replenished from the outside of the guide unit, making certain of serving steadier functions in the long run even with no troublesome maintenance work. With the linear motion guide unit stated just earlier, the slider is composed of a carriage having return passages therein and end caps attached on forward and aft ends of the carriage. The return passages are each provided with a return sleeve that is lengthwise slit and lined with a lubricant applicator over the inside circular surface thereof. The fore-and-aft slit made in the return sleeve constitutes a groove that helps the lubricant spreads easier lengthwise from the lubricant applicator covering the fore-and-aft slit.

With the linear motion guide unit in which rollers are selected as the rolling elements, nevertheless, alignment problems to guide rollers in good rolling order without leaning in rolling posture are more encountered, compared with the construction using balls. Besides, the rollers have to be guided not only on their circular surfaces, but also on their axially opposite end surfaces. Conventionally, there is no linear motion guide unit constructed to meet with an aspect of allowing the rollers to roll through the recirculating circuit over a long-lasting service life with adequate application of lubricant, making certain of steady reliability of the maintenance-free on lubricant application.

With the prior linear motion guide units recited earlier, moreover, the return passage made in the carriage of the slider is defined by just sintered resinous member of cellular geometry, which is lack of mechanical stiffness enough to guide steadily the cylindrical rollers. The rollers, as opposed to the balls, need functioning on line-rolling contact around their circular surfaces without getting tilted in rolling posture. In other words, the rollers have to be not only born against their circular surfaces, but also guided in sliding manner on their axially opposite ends to get the slider moved steadily with smoothness, ensuring the long-lasting service life with stability. Thus, the prior linear motion guide units of the sort in which the return passage is made of only sintered resinous member of cellular geometry, because there is a scarcity of mechanical stiffness in the sintered resinous member, have been unsuited for making certain of smooth recirculation of the rollers. There, advanced technology has come to hope any linear motion guide unit in which the sleeve to define the return passage in the carriage of the slider is much raised in mechanical stiffness, even with simple in construction and easier to fit it into the slider as well as making sure of positive lubricant application to the rolling elements to render the maintenance-free operation steadier.

With the prior linear motion guide means recited earlier in which there is used lubricant-containing polymer sleeve to lubricate the rolling element of ball, it is needed to uniformly mix polymer with oily lubricant to prepare the lubricant-containing polymer and, moreover, the lubricant-containing polymer sleeve have to be molded integrally with the skeleton cage of a preselected material high in stiffness. Production of the lubricant-containing sleeve has thus required special equipment and complicated process.

SUMMARY OF THE INVENTION

The present invention has for its primary object to further develop the prior linear motion guide unit to overcome the shortcomings as stated earlier, and to provide a linear motion guide unit in which a sleeve to define a return passage in a slider is upgraded in mechanical strength over the prior sleeve. More particularly, the present invention provides a linear motion guide unit in which a tubular composition for the sleeve is comprised of a tubular skeleton partially cutaway to have windows therein, and a cellular molded member, the cellular molded member being impregnated in advance with lubricant to fill cells or pores with the lubricant, and followed by fit into the windows to make the tubular composition into a composite construction, and further a fore-and-aft hole inside the tubular composition provides a return passage, which allows rolling elements of rollers to roll through there with the cellular members in the tubular composition coming into contact with all rolling surfaces and axially opposite ends of the rollers to provide steady lubricant application on the rollers, thereby establishing maintenance-free operation to ensure proper lubrication on a recirculating circuit for the rollers.

The present invention is concerned with a linear motion guide unit comprising an elongated guide rail, a slider movable lengthwise of the elongated guide rail, and a rolling element allowed to roll through a circulating circuit composed of a race defined between the elongated guide rail and the slider, and a return passage and a turnaround passage both made in the slider, wherein the return passage is provided by a hole extending forward and aft through a tubular composition installed in the slider, and wherein the tubular composition is comprised of a tubular skeleton having therein a lengthwise window made open from a circular surface thereof to the hole, and a cellular member extending lengthwise to fit into the window in the tubular skeleton.

In one aspect of the present invention, a linear motion guide unit is provided in which the cellular member has an outside surface made curved in transverse section, and an inside surface including therein lengthwise mating edges spaced sidewise away from one another, return race surfaces extending along the lengthwise mating edges, one to each edge, and a recess made midway between the sidewise spaced mating edges to fit over the tubular skeleton.

In another aspect of the present invention, a linear motion guide unit in which the cellular member fits into any one of at least two windows that are made spaced around a curved surface of the tubular skeleton.

In another aspect of the present invention a linear motion guide unit is provided in which the tubular skeleton is made of synthetic resinous material while the cellular member is made of sintered resinous material.

In another aspect of the present invention, a linear motion guide unit is provided in which the cellular molded member is impregnated in advance with lubricant to fill cells with the lubricant, preparatory to installation into the tubular skeleton.

In another aspect of the present invention, a linear motion guide unit in which the slider is composed of a carriage having a raceway surface to provide the race, and end caps arranged on forward and aft ends of the carriage, the end caps being each made therein with a turnaround passage to connect the race with the return passage, and wherein the tubular composition fits into a bore made in the carriage.

In another aspect of the present invention, a linear motion guide unit is provided in which the rolling element is a cylinder having a rolling surface and axially opposite ends, and the tubular composition has a circular outside surface while the hole made in the tubular composition is formed to have a transverse section of rectangle.

In another aspect of the present invention, a linear motion guide unit is provided in which the tubular skeleton has the window made to expose the rolling surfaces of the rollers, and a flexible rib disposed in the window to make rolling-contact with the rolling surface of the roller. In a further another aspect of the present invention, there is provided a linear motion guide unit in which the tubular skeleton is made up of two longitudinal halves, which join together on their mating lengthwise surfaces lying on the flexible rib that is in rolling-contact with the rolling surface of the roller.

In another aspect of the present invention, a linear motion guide unit is provided in which the tubular skeleton has the flexible rib lying lengthwise of the window, while the cellular member has the recess to fit over the flexible rib of the tubular skeleton, the recess being flanked by the return race surfaces.

In another aspect of the present invention a linear motion guide unit is provided in which the return race surfaces lying on the cellular member are made lengthwise midway between the sidewise opposite mating edges.

In a further another aspect of the present invention, a linear motion guide unit is provided in which the return race surfaces on the cellular member are disposed in opposition to the rolling surface and the axially opposed ends of the roller.

In another aspect of the present invention, a linear motion guide unit is provided in which the tubular skeleton is made at forward and aft ends thereof with jaws while the end caps are made with spigots extending out of the turnaround passages to make fit-engagement with their associated jaws in alignment with each other.

In another aspect of the present invention, a linear motion guide unit is provided in which the tubular skeleton is composed of forward and aft ends each made therein with the hole, an intermediate trunk with the hole lying midway between the forward and aft ends, arms lying in diametral opposition and extending lengthwise to reach from the intermediate trunk to any one of the forward and aft ends to define the windows between them, and flexible ribs extending lengthwise inside the windows between the intermediate trunk and any one of the forward and aft ends.

With the linear motion guide unit of the present invention constructed as stated earlier to allow the slider moving relatively to the guide rail, the return passage made in the slider for the circulation of the rolling elements is constituted with the tubular composition fit into the bore drilled in the slider, the tubular composition being composed of the tubular skeleton made therein with windows, and cellular members that fit into the windows, thereby making sure of high stiffness by itself.

The cellular members used in the linear motion guide of the present invention is made of sintered resinous material of porous or cellular texture, which can be impregnated with lubricant to fill cells or pores in the cellular member with the lubricant. Thus, the rolling elements, when coming into rolling-contact with the cellular member while rolling through the return passage, are applied with lubricant film, which would be transferred to the circulating circuit as the rolling elements roll thorough the circuit, thereby establishing maintenance-free operation to ensure proper lubrication on a recirculating circuit for the rolling circuit.

With the linear motion guide unit constructed as stated earlier, moreover, the tubular composition is constituted with the composition of the tubular skeleton of synthetic resinous material high in stiffness and the cellular members of sintered resinous material. This tubular composition of composite construction is much preferable to the provision for stiffness or mechanical strength as well as less occurrence of debris because of wear, which might otherwise get the cellular member clogged up, thereby making certain that the lubricant reserved in the cellular member is applied steadily on the rolling elements for long-lasting period.

The linear motion guide unit constructed according to the present invention, consequently, may serve lubricating function with efficiency in harshest working environment including high temperature, and so on, as well as in clean atmosphere where there are any constraint on the application of lubricant. Further, the linear motion guide unit of the present invention is better for reducing sliding resistance in the load-carrying race in the linear motion guide unit that is high in operating speed and reciprocating cycle, even with no need of maintenance for periodic lubricant replenishment.

DETAILED DESCRIPTION OF THE PREFERRED EMBODIMENTS

Referring now in detail to the drawings, the linear motion guide unit according to the present invention will be explained below. The linear motion guide unit according to the present invention is adapted for use in any relatively sliding components in machinery as diverse as various robots, semiconductor manufacturing machines, precision machines, measurement/inspection instruments, medical instruments, micromachines, machine tools, and so on, and more particular constructed to make sure of maintenance-free operation for better lubricant application to the rolling elements, with using a tubular composition for return passage high in mechanical strength to ensure smooth rolling of the rolling elements through a recirculating circuit with accuracy for a long-lasting service life.

Figure 10:
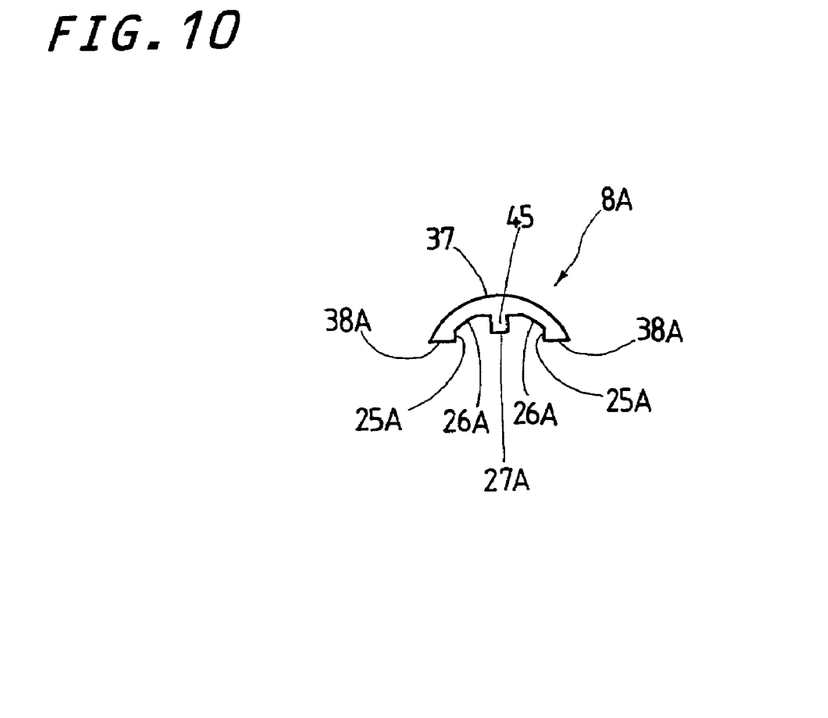
FIG. 10 is a view in front elevation showing another version of the cellular member to complete the tubular composition of FIG. 7.
Figure 11:
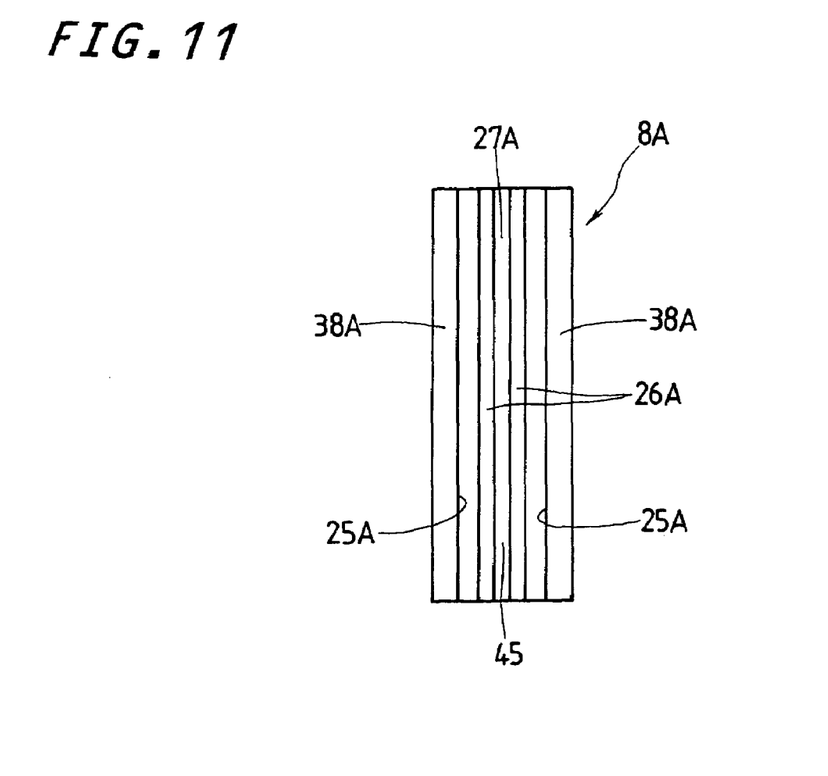
FIG. 11 is a view in bottom elevation showing the cellular member of FIG. 10.

The linear motion guide unit of the present invention is envisaged improving the lubricant application system on the rolling elements used in the conventional linear motion guide units. A preferred embodiment of a tubular composition 6 installed in the linear motion guide unit is illustrated in FIGS. 3 to 6 and 8 to 9, and another version 6A is shown in FIGS. 7 and 10 to 11. With the linear motion guide unit constructed according to the present invention, a tubular composition 6, 6A replacing the conventional sleeve to define a return passage 10 is made of a composition of a tubular skeleton 7(7A) with a cellular member 8, 8A. A central hole 36 is bored axially through the tubular composition 6(6A) to provide the return passage 10. The linear motion guide unit constructed as stated below helps realize the maintenance-free condition for lubricant application to, especially, a recirculating circuit where more than one rolling element 5 of roller rolls through there.

With the linear motion guide unit discussed here, the rollers or cylinders 5 are selected as the rolling elements, and the tubular composition 6(6A) is comprised of the tubular skeleton 7(7A) having a window 24(24A) made open to the central hole 36 or the return passage 10 from a circular outside surface, and a cellular member 8(8A) that fits into the associated window 24. Upon production of the linear motion guide unit of the present invention, the cellular member 8(8A) preparatory to fitting into the associated window 24, 24A in the tubular skeleton 7(7A) is impregnated with lubricant to fill cells or pores in the cellular member 8(8A) with the lubricant. Then, the cellular member 8(8A) impregnated with lubricant fits into the associated window 24(24A) to provide the tubular composition 6(6A). Thereafter, the tubular composition 6(6A) is inserted into a fore-and-aft bore 9 in a slider 2 to finish the return passage 10 where the rollers 5 are steadily applied with lubricant while rolling through there to make sure of adequate lubrication to other rollers 5 that roll through a recirculating circuit, especially a load-carrying race 34.

Figure 1:
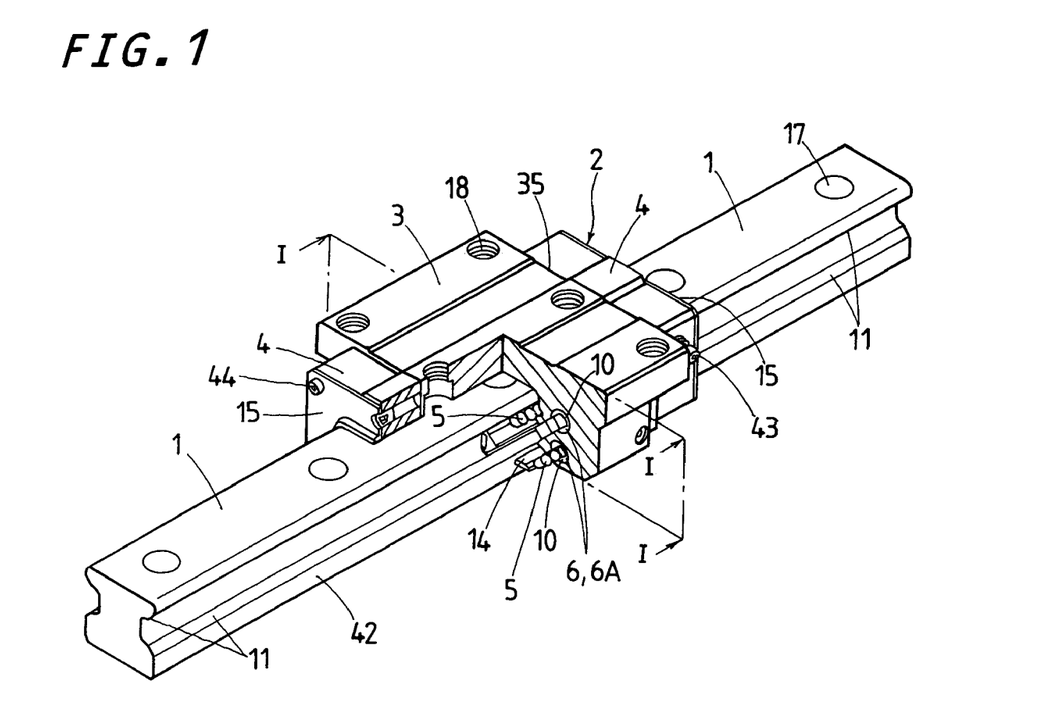
FIG. 1 is a partially cutaway view in front elevation illustrating a preferred embodiment of a linear motion guide unit according to the present invention.
Figure 2:
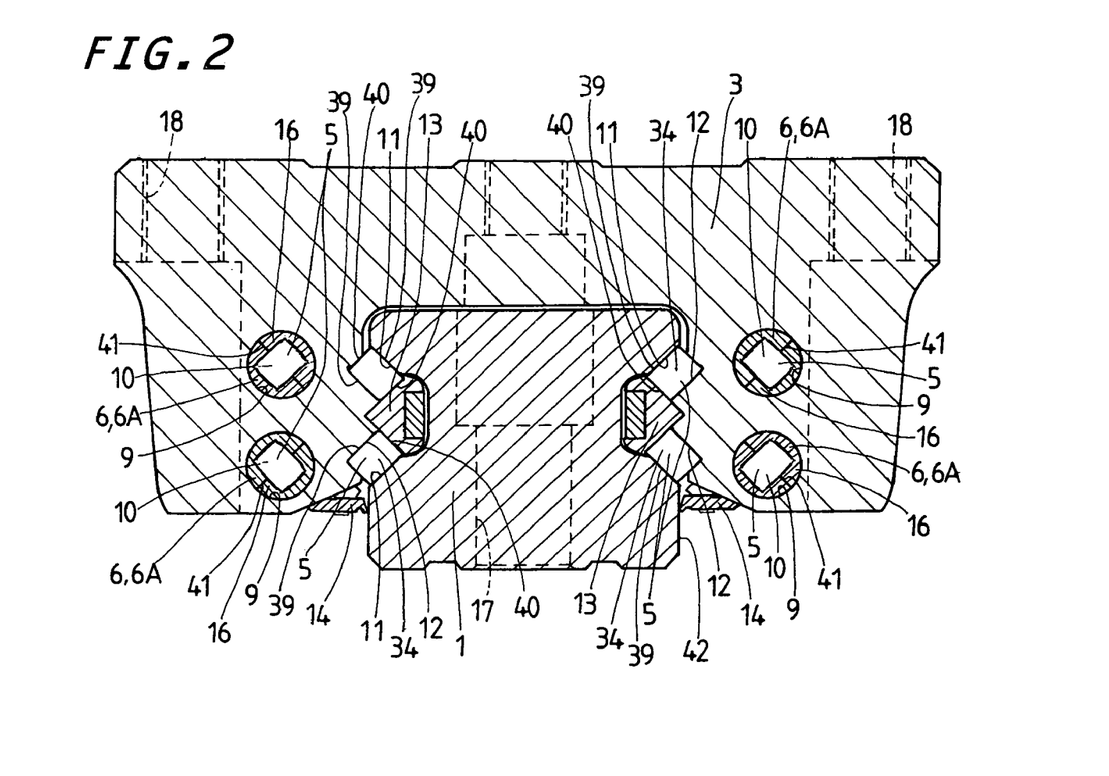
FIG. 2 is a view in transverse section along a plane I-I of FIG. 1 showing the linear motion guide unit.

The linear motion guide unit constructed according to the present invention is best to the construction where the rollers 5 are selected as rolling elements as shown in FIGS. 1 and 2. The linear motion guide unit is comprised of an elongated guide rail 1, a slider 2 allowed to move lengthwise of the guide rail 1, and more than one rolling element 5 of cylindrical roller installed to roll through a circulating circuit that includes a race 34 defined between the guide rail 1 and the slider 2, a return passage 10 and turnaround passages 30 made in the slider 2. The slider 2 is composed of a carriage 3 made thereon with raceway surfaces 12 in opposition to raceway surfaces 11 cut in the guide rail 1, and end caps 4 arranged on forward and aft ends of the carriage 3, one each end, and formed therein with a turnaround passage 30, refer to FIG. 12, to communicate any one race 34 with the associated return passage 10. With the linear motion guide unit constructed as shown in FIG. 1, a pair of the raceway surfaces 11 extending lengthwise in parallel with one another is made on each of widthwise opposite sides 42 of the guide rail 1, while the raceway surfaces 12 in the slider 2 are made in opposition to the raceway surfaces 11 on the guide rail 1 to define the paired load-carrying races 34 between the paired raceway surfaces 11 of each side 42 of the guide rail 1 and their opposing raceway surfaces 12 in the slider 2. More than one cylinder or roller 5 is born on any one of axially opposite ends 40 thereof against an elongated retainer 13 extending along the race 34 across the carriage 3b and the end caps 4 to control the rolling movement of the roller 5.

With the linear motion guide unit of the present invention, a lower seal 14 is disposed to extend over the underneath of the carriage 3 and the forward and aft end caps 4, while end seals 15 are attached to outward end surfaces of the end caps 4. A grease nipple 43 is coupled to any one of the end caps 4 to feed lubricant to the circulating circuit through a lubrication port 29 and an oiling path 32. The guide rail 1 is made with some holes that are used to fasten the guide rail 1 to any stationary bed including machine bed, mounting base, workbench, and so on, while the carriage 3 of the slider 2 is made with threaded holes 18 that are used to install any object including various instruments, works, attachments, and so on thereon. On the end caps 4, moreover, there are provided raised portions 33 below the underneath of the end cap 4 to hold in place the lower seal 14, and also bolt holes 28 to allow bolts to fasten the end caps 4 to the carriage 3. The end caps 4 are each made therein with the lubrication port 29 fed with lubricant from any lubricant source including the grease nipple, and so on, and the oiling path 32 to communicate the lubrication port 29 to the circulating circuit. With the linear motion guide unit constructed as stated earlier, as shown in FIG. 2, the rollers 5 rolling through the upper load-carrying race 34 enter the lower return passage 10 while other rollers 5 running through the lower load-carrying race 34 enter the upper return passage 10 as the slider 2 moves relatively along the guide rail 1.

The return passage 10 in the linear motion guide unit of the present invention is defined in a tubular composition 6 having a central axial hole 36, which fits into the fore-and-aft bore 9 made in the carriage 3 of the slider 2. The tubular composition 6 is comprised of the tubular skeleton 7 to make certain of mechanical stiffness or strength in the tubular composition for itself, and the cellular members 8 impregnated with lubricant to ensure adequate lubrication onto the rollers 5.

Figure 3:
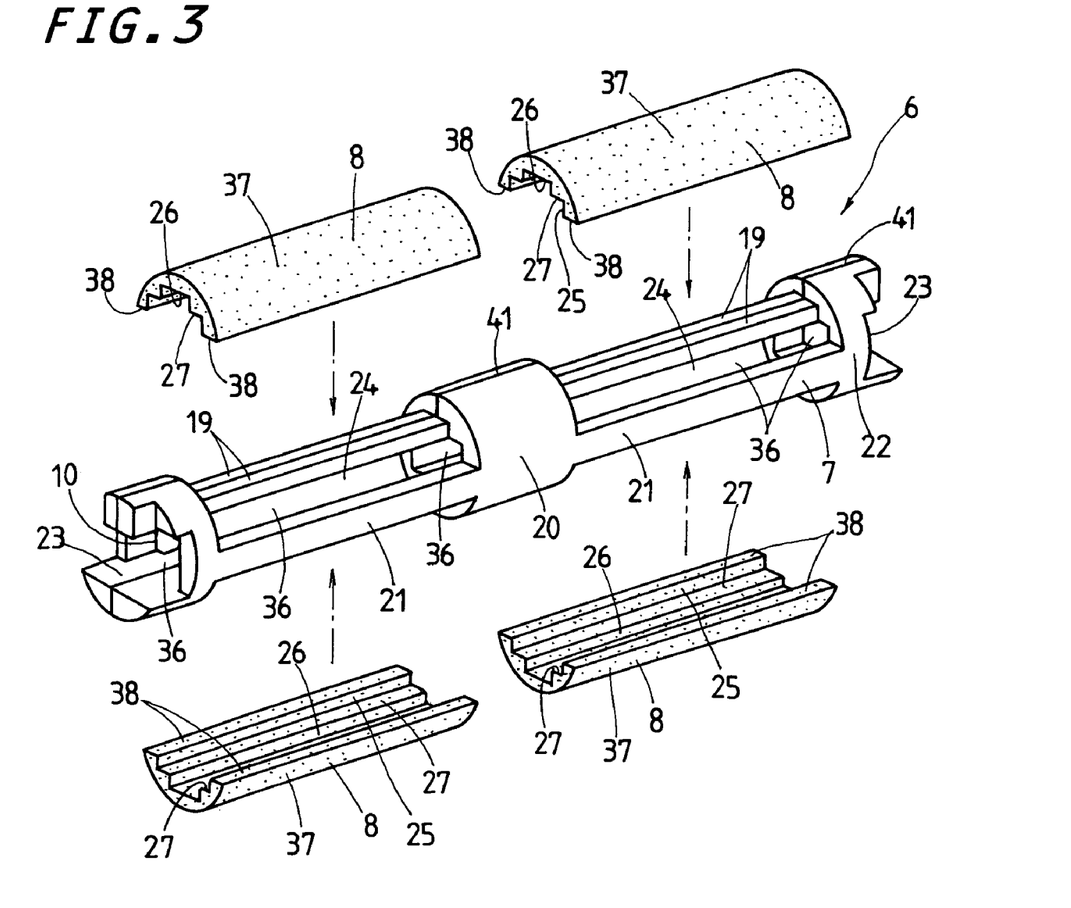
FIG. 3 is an exploded view in perspective showing a tubular composition to be fit in the slider of FIG. 1.
Figure 6:
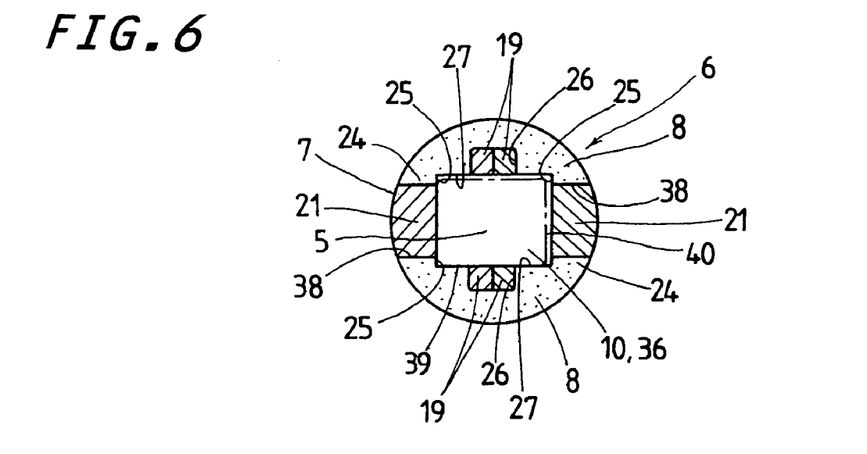
FIG. 6 is a view in transverse section of the tubular composition and taken on the plane of the line II-II of FIG. 4.
Figure 7:
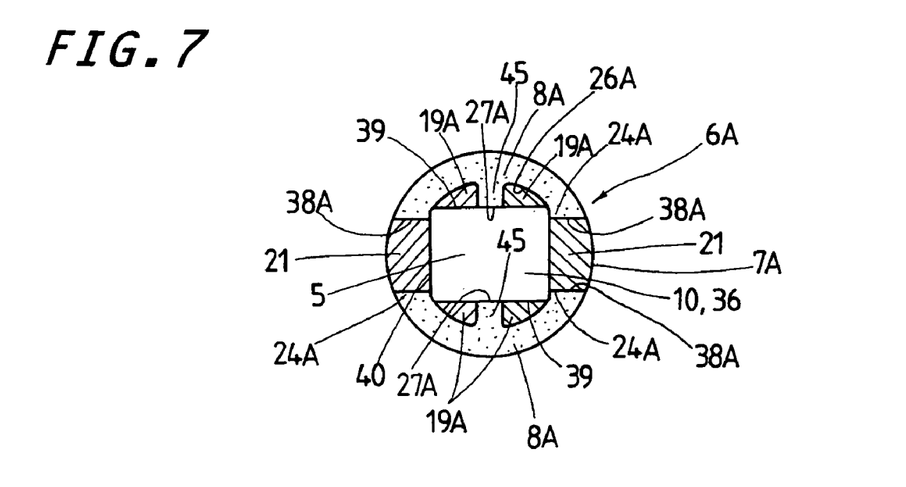
FIG. 7 is a view in transverse section of another embodiment of the tubular composition and taken on the same plane in FIG. 6.

As shown in FIGS. 3 and 6, the tubular composition 6 is made of a composite construction of the tubular skeleton 7 extending fore and aft with the cellular members 8 also elongated lengthwise, which fit into the windows 24 from the circular outside surface to get exposed into the central hole 36 or the return passage 10. The cellular members 8 are each made of any molded or cast material with a desired shape to fit easily into the window 24 in the tubular skeleton 7. The tubular skeleton 7 retains enough mechanical stiffness or strength to make sure of allowing the rollers 5 to roll through the circulating circuit with steadiness and reliability for a prolonged working period. Many windows 24 are made in the tubular skeleton 7 in a fashion extending lengthwise of the tubular skeleton 7 while the cellular members 8 are applied on the tubular skeleton 7 from the circular outside to fit into the windows 24 to finish the composition that is ready for soaking up and retaining lubricant, followed by applying the lubricant onto the rollers 5. The tubular composition 6 where the cellular members 8 unite with the tubular skeleton 7 into the composition is designed to fit easier into the fore-and-aft bore 9 in the carriage 3, for example made to allow a clearance of a matter of 0.1 mm between the outside circular surface of the tubular composition 6 and the mating inside circular surface of the fore-and-aft bore 9. Thus, the tubular composition 6 is made to loose-fit into the fore-and-aft bore 9.

Figure 4:
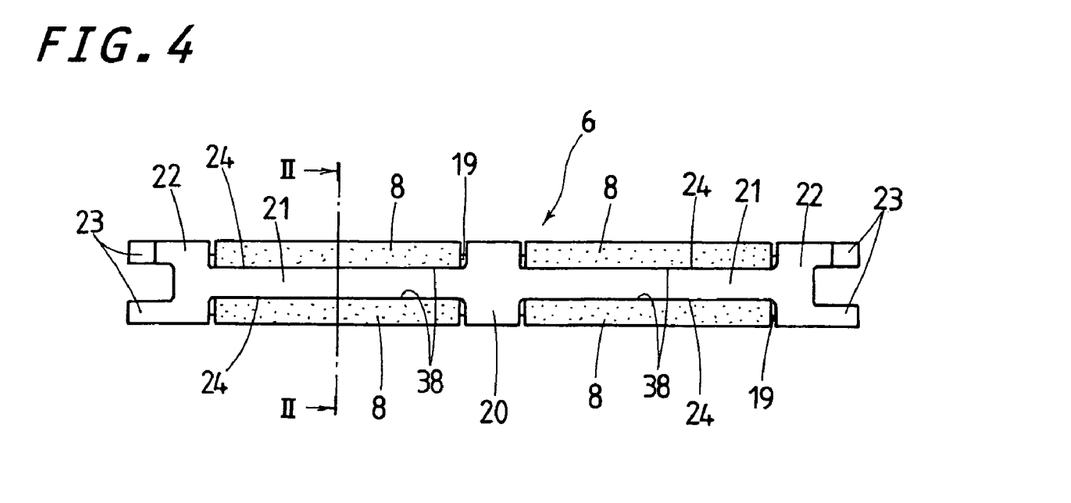
FIG. 4 is a view in front elevation of the tubular composition of FIG. 3.
Figure 5:
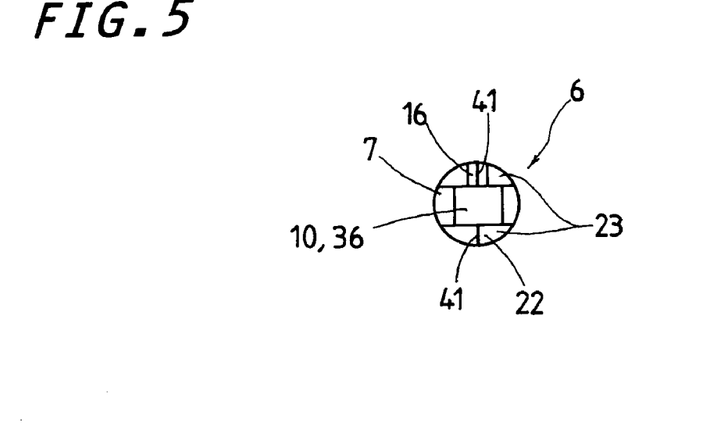
FIG. 5 is a view in side elevation of the tubular composition of FIG. 4.
Figure 13:
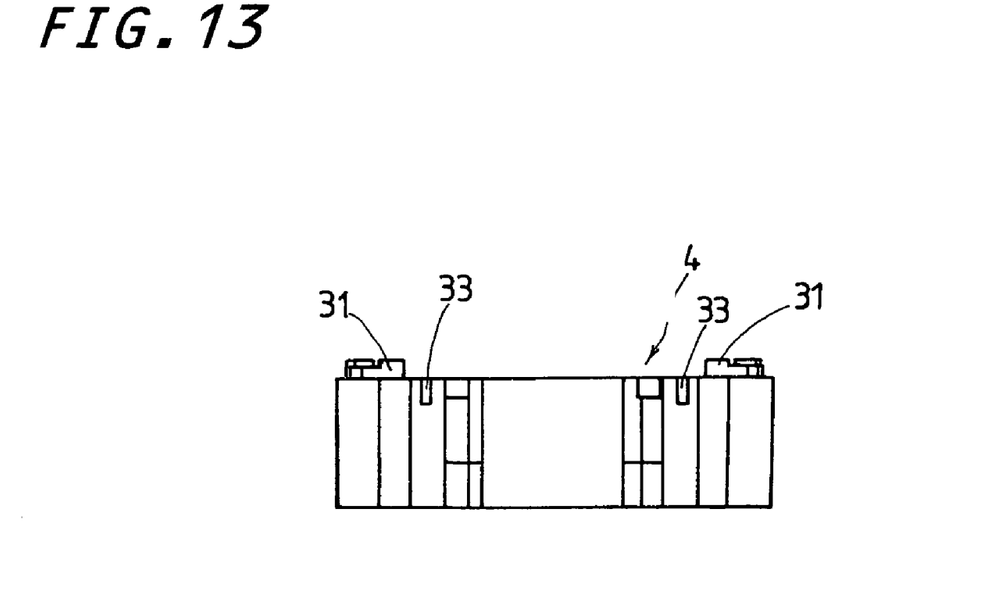
FIG. 13 is a view in lower elevation showing the end cap of FIG. 12.

With the linear motion guide unit of the present invention, the tubular skeleton 7 of the tubular composition 6, as seen in FIGS. 3 to 4 and FIG. 13, is made at forward and aft ends 22 thereof with jaws 23 while the end caps 4 are made on their rearwards with spigots 31 extending out of the turnaround passages 30 into the corresponding return passages 10. The jaws 23 formed on the tubular skeleton 7 make fit-engagement with their associated spigots 31 to couple the tubular composition 6 with the end caps 4. Thus, the tubular composition 6, although lying loosely inside the fore-and-aft bore 9 of the carriage 3, gets fastened against the end caps 4 attached to the forward and aft ends of the carriage 3. The end caps 4 are fastened to the carriage 3 by means of bolts 44, shown in FIG. 1, which are tightened through bolt holes 24 in the end caps 4 in a manner to keep the jaws 23 of the tubular skeleton 7 in mating relation with their complementary spigots 31 of the end caps 4. Thus, the tubular skeleton 7 is brought into the precise position relative to the end caps 4 for keeping the return passages 10 in perfect alignment with their turnaround passages 30. Getting the spigots 31 of the end caps 4 to mate with their complementary jaws 23 of the tubular skeleton 7 makes sure of connection where the return passage 10 and the associated turnaround passages 30 are made flush with one another to finish the recirculating circuit of rectangular shape in transverse section with causing no gap at the connection between the return passage 10 and the turnaround passages 30. Coplanar connection with no gap between the turnaround passages 30 in the end caps 4 and the associated return passage 10 defined in the tubular composition 6 fit snugly in the fore-and-aft bore 9 in the carriage 3 makes certain of allowing the rollers 5 to transfer smoothly from the turnaround passages 30 to their associated return passage 10 and also from the return passage 10 to the turnaround passages 30 in a circulating manner.

The tubular skeleton 7 is composed of the forward and aft ends 22 each made therein with the central axial hole 36 and the jaws 23, an intermediate trunk 20 with the central axial hole 36 midway between the forward and aft ends 22, arms 21 lying opposing sidewise and extending lengthwise to reach from the intermediate trunk 20 to any one of the forward and aft ends 22 to define the windows 24 between them, and flexible ribs 19 extending lengthwise inside the windows 24. The intermediate trunk 20 is especially benefit to make certain of satisfactory stiffness or mechanical strength when the tubular skeleton 7 is large in longitudinal direction. In contrast, the tubular skeleton 7 short in lengthwise dimension, although not shown, would be enough ensured for stiffness even if there is no intermediate trunk 20 midway between the forward and aft ends 22. The flexible ribs 19 in the tubular skeleton 7 are disposed setback inwards in a way extending lengthwise between the intermediate trunk 20 and any one of the forward and aft ends 22 midway between the sidewise opposed arms 21 in circular direction to make fit-engagement with the cellular members 8 to make sure of bearing the cellular members 8 against them. With the tubular skeleton 7 of the sort there is provided no intermediate trunk, the flexible ribs 19 are disposed setback inwards in a way extending lengthwise between the forward and aft ends 22 midway between the sidewise opposed arms 21 in circular direction. The tubular composition 6 is formed in a circular contour as a whole viewed in transverse section to have a cylindrical outside surface, while the central axial hole 36 is formed to have a rectangular configuration in transverse section, which is suited for allowing the rollers 5 to roll through there. The central axial hole 36 rectangular in transverse section is made to have a dimension of just over an axial section of the cylindrical roller 5 to allow the rollers 5 rolling through there with smoothness.

The cellular member 8 for the tubular composition 6 is made to have a circular outside surface extending lengthwise of the tubular composition 6, and a circular inside surface where there are made mating edges 38 extending lengthwise in sidewise opposed fashion to one another to be mated with their associated arms 21 of the tubular skeleton 7, return races 25 and 27 extending beside the mating edges 38, one to each edge, to provide partially the return passages 10, and a recess 26 extending in a longitudinal direction midway between the mating edges 38 to fit over the tubular skeleton 7. The cellular members 8 on their mating edges 38 don't have to make engagement with the arms 21 of the tubular skeleton 7 and can be placed to leave any clearance away from the arms 21. The arms 21 of the tubular skeleton 7, although but made in the embodiment shown here to make abutment between the forward and aft ends 22 against the mating edges 38 of the cellular members 8, can be made to extend over the mating edges 38 to cover the sidewise opposite sides of the cellular members 8. In this alternative, just pushing the sidewise edges of the cellular members 8 into the associated windows 23 in the tubular skeleton 7 may be sufficient to hold the cellular members 8 on the tubular skeleton 7 and, therefore, the cellular members 8 has no mating edges to come into abutment against the arms of the tubular skeleton 7, but may make only line contact along their sidewise outside edges, not shown.

The cellular members 8, as shown in FIGS. 3 and 4, are installed from above and below into the windows 24, which are arranged on the top and the bottom between the arms 21 spaced away from one another in circular direction. The cellular members 8 also fit into the windows 24 in a way lying lengthwise on opposite sides of the intermediate trunk 20 of the tubular skeleton 7. Thus, the linear motion guide unit constructed as stated earlier, in all, has four pieces of cellular members 8 installed in the tubular skeleton 7. Moreover, the lengthwise recess 26 inside the cellular member 8 to fit over the flexible ribs 19 of the tubular skeleton 7 is flanked by the return races 25 and 27. Thus, the cellular member 8 is made of a mold with a desired shape to fit snugly into the window 24 in the tubular skeleton 7. The cellular member 8 further has the circular outside surface and the inside surface where there are made the return races 25 and 27 to provide the return passage 10.

Figure 8:
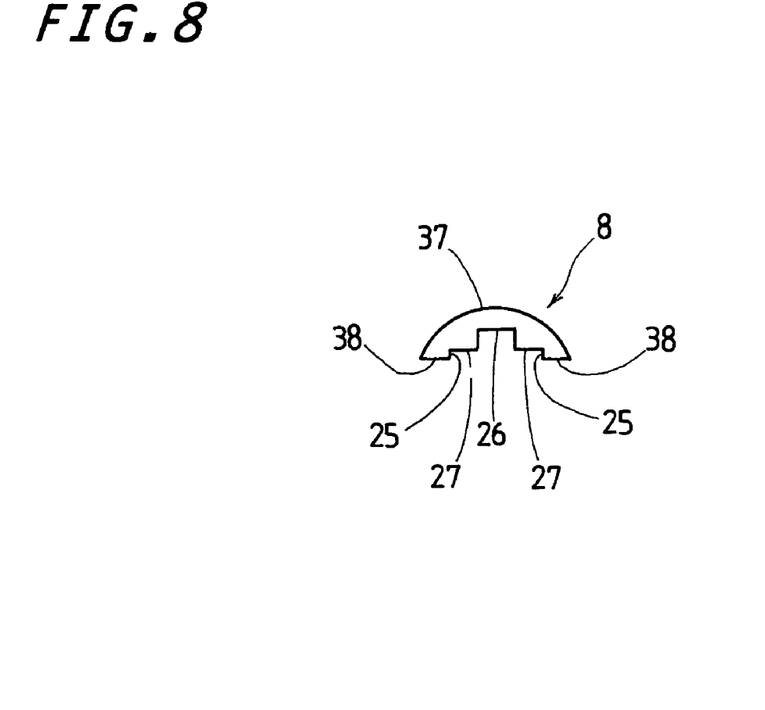
FIG. 8 is a view in front elevation showing a preferred embodiment of a cellular member incorporated in the tubular composition of FIG. 3.
Figure 9:
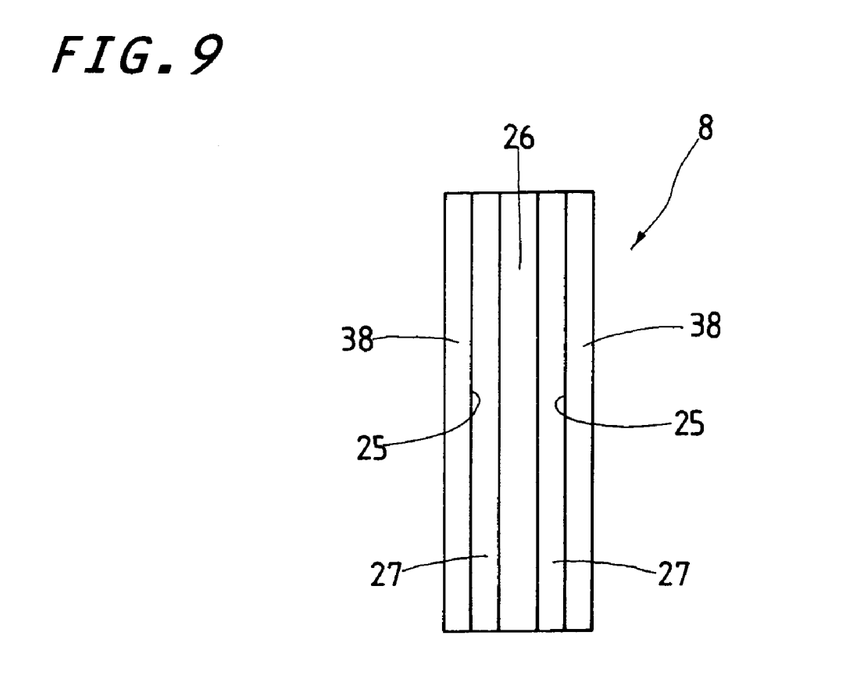
FIG. 9 is a view in bottom elevation showing the cellular member of FIG. 8.

The cellular member 8, as seen in FIGS. 3 and 8, is made on the inside surface thereof with the recess 26 to fit over the flexible ribs 19 of the tubular skeleton 7. Four pieces of cellular member 8 in the embodiment discussed here are installed in the tubular skeleton 7 in a way separating away from one another. As an alternative, four cellular members 8 are not separated into distinct members, but may be made connected partially with one another. With the construction in which the cellular members 8 are joined in series with one another in the lengthwise direction through any connector, for example, the intermediate trunk 20 of the tubular skeleton 7 is cut to provide a slot to fit the connector therein. With another alternative in which the cellular members 8 are joined together in circular direction through any connector, the arms 21 of the tubular skeleton 7 is cut to a circular slot to fit the connector therein.

Figure 12:
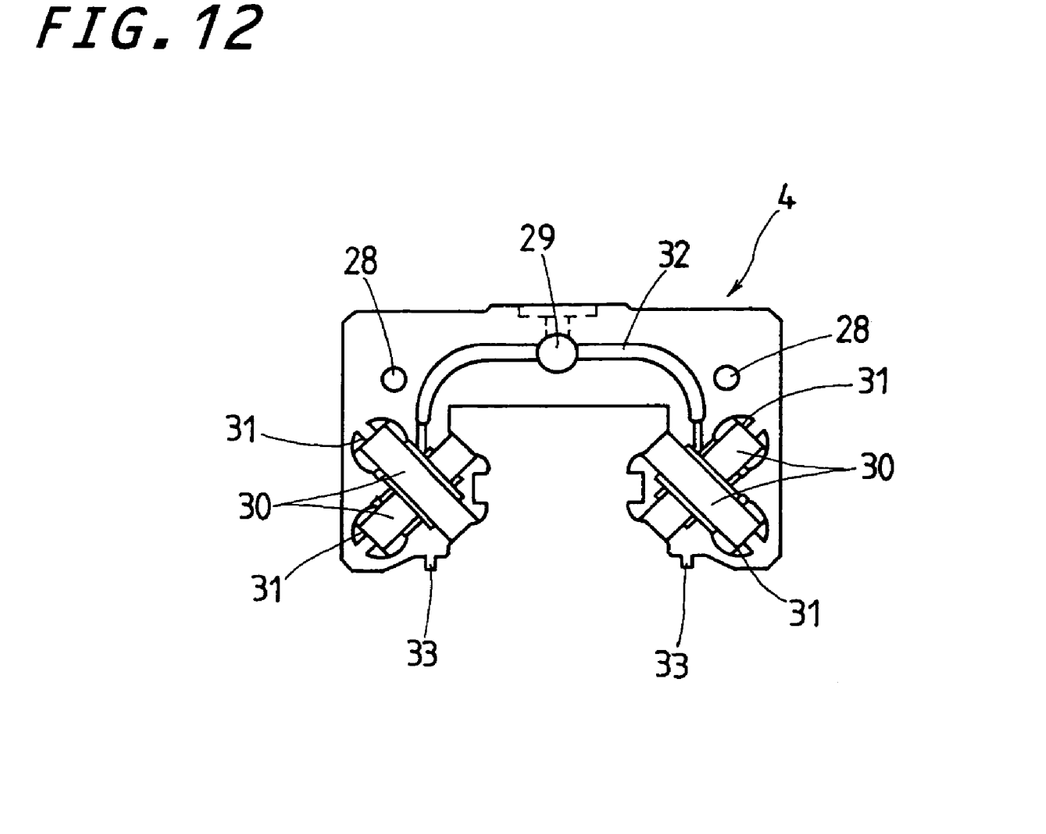
FIG. 12 is a view in back elevation showing an end cap in the linear motion guide unit of FIG. 1.

Of the return races 25 and 27 made on the cellular member 8, as especially shown in FIGS. 3 and 6, one return race 27 is to make rolling-contact with the rolling surface 39 of the cylindrical roller 5 while the other race 25 is to make in part the sliding-contact with axially opposite ends 40 of the cylindrical roller 5. Thus, the cellular member 8 is set to come into contact with both the rolling surface 39 and the axially opposite ends 40 of the cylindrical roller 5 against the return races 25 and 27. The cellular members 8 installed in the tubular skeleton 7 as stated earlier ensure the provision of the return passages 10 where the return races 25 and 27 are constantly kept in contact with the rolling surface 39 and the axially opposite ends 40 of the cylindrical roller 5, respectively, no matter whether the linear motion guide unit works in any posture. The cellular member 8 serves to absorb lubricant, which fills pores or cells to be held in the cellular texture and later applied to the rollers 5. To this end, the cellular members 8 ahead of their assembly with the tubular skeleton 7 are impregnated with the lubricant and later joined together with the tubular skeleton 7. With the embodiment constructed as stated earlier, the cellular members 8 are previously impregnated with the lubricant preparatory to fitting into the tubular skeleton 7. Even after the lubricant has run out during operation of the linear motion guide unit, just supply of lubricant through the grease nipple 43 in FIG. 1 or the lubrication port 29 in FIG. 12 is sufficient. In some cases, excess lubricant would be absorbed into the cellular members 8 with the aid of the cylindrical rollers 5. Besides, the desired lubricant may be selected from various lubricants depending on the requisites for operational conditions.

Moreover, the tubular skeleton is made of synthetic resin while the cellular member 8 is made of sintered resinous material. The tubular skeleton 7 is needed to allow the rollers 5 running through the return passages 10 with smoothness for long-lasting circulating movement. To cope with this, the tubular skeleton 7 is made of any material that is high in stiffness and no or less in wear, which might otherwise occur resulting from any pressing action exerted by the rolling surfaces 39 of the rollers 5, any sliding engagement with the axially opposite ends 40 of the rollers 5, and any wedge action due to the circular edges of the rollers 5. The tubular skeleton 7 is made of, for example any one of synthetic resins, and metals including aluminum, and so on. In the embodiment discussed now, the tubular skeleton 7 was produced of synthetic resins including polyacetal, and so on. Any material would be selected for the cellular members 8 as long as the material is suited for the provision of cellular texture that could allow absorption, retention and delivery of lubricant, even with wear proof property. In the embodiment recited here, the cellular member 8 was made of sintered resinous material, for example a sintered compact product of a powder of ultrahigh molecular weight polyethylene.

With tubular skeleton 7 constructed as stated earlier, the windows 24 are made to expose the rolling surfaces 39 of the rollers 5 while the flexible ribs 19 are disposed in the windows 24 to make rolling contact with the rolling surfaces 29 of the rollers 5. Thus, the flexible ribs 19 susceptible to elastic deformation would mainly involve guiding the rolling surfaces 39 of the rollers 5. The windows 24, as shown in FIG. 6, are made opened from the circular outside surface to the return passage 10 to expose the rolling surfaces 39 of the rollers 5 at two locations in diametral opposition to one another. The tubular skeleton 7 is made up of two longitudinal halves, which join together on their mating lengthwise surfaces 41 lying on the flexible ribs 19 that are in rolling-contact with the rolling surfaces 39 of the rollers 5. Division of the tubular skeleton 7 into two longitudinal halves is envisaged making molding operation of synthetic resin material easier, making production of mold cavity easier and further making it easier to provide parts susceptible to elastic deformation. Longitudinal halved portions 16 having the mating lengthwise surfaces 41 thereon, as shown in FIG. 6, provide the flexible ribs 19 susceptible to elastic deformation to adjust snugly to the rolling surface 39 of the roller 5.

Referring now to FIGS. 7, 10 and 11, there is illustrated another modified tubular composition 6A installed in the linear motion guide unit of the present invention. Most of the components of the modified tubular composition 6A are the same as previous described. To that extent, the components have been given the same reference with a suffix "A", so that the previous description will be applicable. The present description will be largely confined to the differences between the modified tubular composition 6A and the tubular composition 6, previously described.

The tubular composition 6A is composed of a tubular skeleton 7A and cellular members 8A that fit into their associated windows 24A cut into the tubular skeleton 7A. The cellular members 8A are each provided inside thereof with a lengthwise spine 45 flanked by recesses 26A. A return race 27A inside the cellular member 8A is made atop the lengthwise spine 45 in a way extending midway between sidewise opposite mating edges 38A that extend lengthwise in parallel with one another. In other words, the return race 27A inside the cellular member 8A lies midway between the sidewise spaced mating edges 38A to bear the rolling surfaces 39 of the rollers 5 at their axial middle areas. The rollers 5 will come into rolling-contact with the races 27A of the cellular members 8 at their rolling surfaces 39 while come into sliding-contact with other races 25A of the cellular members 8 at their axially opposite ends 40, which are formed in adjacency with the sidewise opposite mating edges 38A to guide the axially opposite ends 40 of the rollers 5 along there. Moreover, the tubular skeleton 7A has flexible ribs 19A extending on either sides of the lengthwise spine 45, one to each side, in a way lying in opposition to the rolling surfaces 39 of the rollers 5 to come into rolling-contact with the rolling surfaces 39 of the rollers 5.

What is claimed is:

1. A linear motion guide unit comprising an elongated guide rail, a slider movable lengthwise of the elongated guide rail, and a rolling element allowed to roll through a circulating circuit composed of a race defined between the elongated guide rail and the slider, and a return passage and a turnaround passage both made in the slider, wherein the return passage is provided by a hole extending forward and aft through a tubular composition installed in the slider, wherein the tubular composition is comprised of a tubular skeleton having therein a lengthwise window made open from a circular surface thereof to the hole, and a cellular member extending lengthwise to fit into the window in the tubular skeleton, and wherein the rolling element is a cylinder having a rolling surface and axially opposite ends, and the tubular composition has a circular outside surface while the hole made in the tubular composition is formed to have a transverse section of rectangle.

2. A linear motion guide unit constructed as defined in claim 1, wherein the cellular member has an outside surface made curved in transverse section, and an inside surface including therein lengthwise mating edges spaced sidewise away from one another, return race surfaces extending along the lengthwise mating edges, one to each edge, and a recess made midway between the sidewise spaced mating edges to fit over the tubular skeleton.

3. A linear motion guide unit constructed as defined in claim 2, wherein the cellular member has the recess being flanked by the return race surfaces.

4. A linear motion guide unit constructed as defined in claim 2, wherein the return race surfaces lying on the cellular member are made lengthwise midway between the sidewise opposite mating edges.

5. A linear motion guide unit constructed as defined in claim 1, wherein the cellular member fits into any one of at least two windows that are made spaced around a curved surface of the tubular skeleton.

6. A linear motion guide unit constructed as defined in claim 1, wherein the tubular skeleton is made of synthetic resinous material while the cellular member is made of sintered resinous material.

7. A linear motion guide unit constructed as defined in claim 1, wherein the cellular member is impregnated in advance with lubricant to fill cells with the lubricant, preparatory to installation into the tubular skeleton.

8. A linear motion guide unit constructed as defined in claim 1, wherein the slider is composed of a carriage having a raceway surface to provide the race, and end caps arranged on forward and aft ends of the carriage, the end caps being each made therein with a turnaround passage to connect the race with the return passage, and wherein the tubular composition fits into a bore made in the carriage.

9. A linear motion guide unit constructed as defined in claim 8, wherein the tubular skeleton is made at forward and aft ends thereof with jaws while the end caps are made with spigots extending out of the turnaround passages to make fit-engagement with their associated jaws in alignment with each other.

10. A linear motion guide unit constructed as defined claim 1, wherein the tubular skeleton has the window made to expose the rolling surfaces of the rollers, and a flexible rib disposed in the window to make rolling-contact with the rolling surface of the roller.

11. A linear motion guide unit constructed as defined claim 1, wherein the tubular skeleton is made up of two longitudinal halves, which join together on their mating lengthwise surfaces lying on rolling-contact with the rolling surface of the roller.

12. A linear motion guide unit constructed as defined claim 1, wherein the return race surfaces on the cellular member are disposed in opposition to the rolling surface and the axially opposed ends of the roller.

13. A linear motion guide unit constructed as defined in claim 1, wherein the tubular skeleton is composed of forward and aft ends each made therein with the hole, an intermediate trunk with the hole lying midway between the forward and aft ends, arms lying in diametral opposition and extending lengthwise to reach from the intermediate trunk to any one of the forward and aft ends to define the windows between them, and flexible ribs extending lengthwise inside the windows between the intermediate trunk and any one of the forward and aft ends.

* * * * *

UNITED STATES PATENT AND TRADEMARK OFFICE
CERTIFICATE OF CORRECTION

| | | |
|---|---|---|
| PATENT NO. | : 7,354,198 B2 | |
| APPLICATION NO. | : 11/228205 | |
| DATED | : April 8, 2008 | |
| INVENTOR(S) | : Toyohisa Ishihara | |

It is certified that error appears in the above-identified patent and that said Letters Patent is hereby corrected as shown below:

On the title page, item (12) and item (75) Inventor, delete "NISHIHARA" and insert --ISHIHARA--.

Signed and Sealed this
Eighth Day of May, 2012

David J. Kappos
*Director of the United States Patent and Trademark Office*